United States Patent [19]

Satake et al.

[11] Patent Number: 5,598,091
[45] Date of Patent: Jan. 28, 1997

[54] THREE-PHASE BRUSHLESS SELF-EXCITED SYNCHRONOUS GENERATOR WITH NO ROTOR EXCITING WINDINGS

[75] Inventors: Satoru Satake, Tokyo; Yukio Hosaka, Hiroshima; Yukio Onogi, Hiroshima; Kenji Inoue, Hiroshima, all of Japan

[73] Assignee: Satake Corporation, Tokyo, Japan

[21] Appl. No.: 513,526

[22] Filed: Aug. 10, 1995

[30] Foreign Application Priority Data

Aug. 11, 1994  [JP]  Japan ..................... 6-212044

[51] Int. Cl.⁶ ..................................... H02P 9/10
[52] U.S. Cl. .................. 322/62; 322/63; 322/86; 310/180; 310/184
[58] Field of Search ................ 322/62, 63, 86, 322/87, 88; 310/180, 184; 361/21

[56] References Cited

U.S. PATENT DOCUMENTS

| | | | |
|---|---|---|---|
| 4,103,217 | 7/1978 | Auinger et al. | 322/28 |
| 4,121,148 | 10/1978 | Platzer | 322/59 |
| 4,246,532 | 1/1981 | Kubo | 322/89 |
| 4,851,758 | 7/1989 | Osada et al. | 322/63 |
| 5,239,254 | 8/1993 | Inoue et al. | 322/86 |
| 5,532,574 | 7/1996 | Wolfe et al. | 322/37 |

FOREIGN PATENT DOCUMENTS

3-245755  11/1991  Japan.
4-285454  10/1992  Japan.

*Primary Examiner*—Steven L. Stephan
*Assistant Examiner*—Nicholas Ponomarenko
*Attorney, Agent, or Firm*—Fish & Richardson P.C.

[57] ABSTRACT

On a stator core, there are wound primary generating windings of four (4) poles with a distributed full-pitch winding structure and stator excitation windings with a concentrated full-pitch winding structure, having the number of poles odd-number times the number of poles of the primary generating windings, that is, twelve (12) poles. The primary windings appropriately produce spatial higher harmonic components of the armature reaction magnetic fields. The excitation windings are connected to the center taps of the primary windings through a control rectifier. On a rotor core, six field windings of four poles. The field windings are arranged at positions where they are magnetically coupled with both static magnetic fields produced by the stator excitation windings and odd-order spatial higher harmonic components of armature reaction magnetic fields produced by the currents in the primary generating windings. The field windings are short-circuited by the diodes, respectively. In the brushless self-excited synchronous generator, the number of slots in each of the rotor and stator can be determined irrespective of the order number of the spatial higher harmonic components of the armature reaction magnetic fields. The generator is simple and rigid in its structure.

7 Claims, 4 Drawing Sheets

THREE-PHASE BRUSHLESS SELF-EXCITED SYNCHRONOUS GENERATOR WITH NO ROTOR EXCITING WINDINGS

BACKGROUND OF THE INVENTION

(1) Field of the Invention

The present invention relates to a brushless self-excited synchronous generator, and more particularly to a three-phase self-excited synchronous generator which is simple and rigid in its structure, in which magnetic vibrations and noise are reduced, which is capable of producing voltages of flat-compound characteristics against load variations due to the provision of a series excitation function internally, and in which the output voltages respectively at non-loaded and loaded states are freely controllable.

(2) Description of the Related Art

Figure 1:
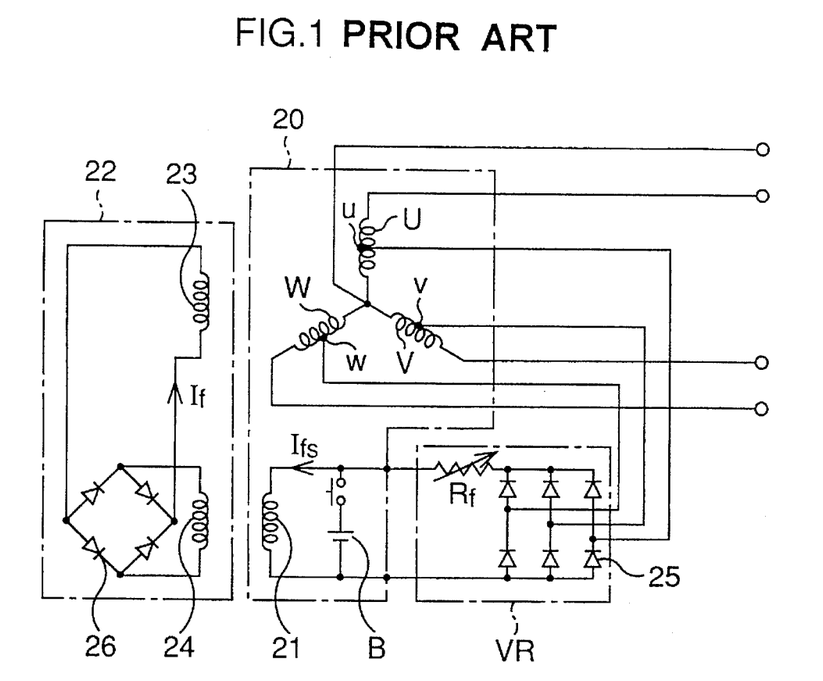
FIG. 1 is a circuit diagram showing an example of a conventional self-excited synchronous generator.
Figure 2:
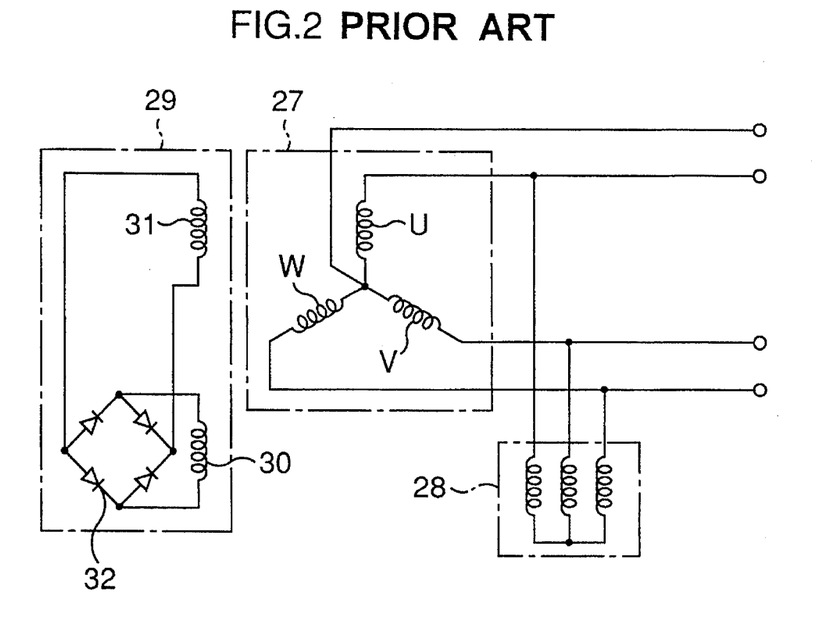
FIG. 2 is a circuit diagram showing another example of a conventional self-excited synchronous generator.

A brushless self-excited synchronous generator which has a series excitation function internally and which is capable of outputting a voltage of flat-compound characteristics is disclosed in, for example, Japanese Patent Application Kokai Publication No. Hei 3-245755 or Kokai Publication No. Hei 4-285454. FIG. 1 diagrammatically shows a circuit of such a brushless self-excited synchronous generator disclosed in the former Publication No. Hei 3-245755 and FIG. 2 diagrammatically shows a circuit of the same disclosed in the latter Publication No. Hei 4-285454.

Referring to FIG. 1, an explanation is made on the brushless self-excited synchronous generator disclosed in Japanese Patent Application Kokai Publication No. Hei 3-245755. On a stator iron core 20, there are wound primary generating windings U, V, W of two poles (in this embodiment) having a concentrated full-pitch or its corresponding winding structure, and stator field windings 21 having the number of poles five times (in this embodiment) that of the primary generating windings, that is, ten poles (in this embodiment). On a rotor iron core 22, there are wound rotor field windings 23 which have the same number of poles as that of the primary generating windings, that is, two poles (in this embodiment) and rotor excitation windings 24 which have the same number of poles as that of the stator field windings 21, that is, ten poles and which are magnetically coupled with fifth-order spatial higher harmonic components (ten-poles magnetic fields) of the armature reaction magnetic fields produced by the currents in the primary generating windings. Center tap terminals u, v, w, respectively, provided on the phase primary generating windings U, V, W are connected to the stator field windings 21 through a control rectifier device VR which is formed by a three-phase full-wave rectifier 25 and a variable resistor $R_f$. The rotor excitation windings 24 are connected to the rotor field windings 23 through a diode bridge circuit 26.

Now, actual operation of the above brushless self-excited generator is explained. When the rotor is rotated, electromotive forces are induced in the primary generating windings U, V, W due to the residual magnetism in the rotor iron core 22. Alternating currents (AC) flow in the primary generating windings U, V, W dependent on the induced electromotive forces. The induced electromotive forces are also applied, after having been rectified by the three-phase full-wave rectifier 25, to the stator field windings 21 so that a direct current (DC) $I_{fs}$ flows in the stator field windings 21. In the rotor excitation windings 24, there are induced overlapped electromotive forces the magnitude of which depends on the static magnetic field produced by the DC current $I_{fs}$ flowing in the stator field windings 21 and those based on the fifth-order harmonic components of the armature reaction magnetic field produced by the AC currents flowing in the primary generating windings. The overlapped electromotive forces thus induced are rectified by the diode bridge circuit 25 so that a direct current $I_f$ flows in the rotor field windings 23. As a result, the primary magnetic fields increase and the electromotive forces induced in the primary generating windings increase accordingly. The value of the output voltage is self-established based on the repetition of the operation explained above. In the case where the residual magnetism in the rotor iron core 22 is insufficient, a starting or initial excitation may be carried out by a battery B directly connected to the stator field windings 21.

In the above brushless self-excited synchronous generator, in accordance with the increase or decrease in the three-phase resistor loads or inductive loads (lagging power factor), the fifth-order spatial higher harmonic components of the armature reaction magnetic fields increase or decrease in proportion to the increase or decrease in the load currents and, as a result, the DC currents $I_f$ in the rotor field windings 23 increase or decrease, whereby the fluctuations of the output voltages are prevented. Thus, the generator can produce an output voltage of the flat-compound characteristics with respect to the increase or decrease in the loads. In the case where three-phase unbalanced loads or single-phase loads are applied to the above generator, though the series excitation effects due to the fifth-order spatial higher harmonic components of the armature reaction magnetic fields will be lowered as compared with the case of the three-phase balanced loads, electromotive forces are induced in the rotor field windings 23 by the spatial fundamental component of opposite phase of the armature reaction magnetic fields at the three-phase unbalanced loads or the single-phase loads. Since the induced electromotive forces are rectified by the diode bridge circuit 26 and compensate the reduced amount of the DC current $I_f$ in the rotor field windings 23, which is caused by the decrease of the series excitation effects, the generator at the three-phase unbalanced or single-phase load state exhibits the same flat-compound characteristic as in the three-phase balanced load state. Further, with the above brushless self-excited generator, the output voltages respectively at the non-loaded and loaded states can be freely controlled by the control of the DC variable resistor $R_f$ serially connected to the stator field windings 21.

The brushless self-excited synchronous generator disclosed in Japanese Patent Application Kokai Publication No. Hei 4-285454 has the following circuit structure. Armature windings U, V, W of two poles (in this embodiment) having a concentrated full-pitch or its corresponding winding structure are wound on a stator iron core 27. A reactor 28 is connected in parallel to the armature windings U, V, W, thereby forming closed loop circuits. On a rotor iron core 29, there are wound rotor excitation windings 30 of ten poles (in this embodiment) which are magnetically coupled with the fifth-order spatial higher harmonic components of the armature reaction magnetic fields produced by the armature windings U, V, W, and rotor field windings 31 which have the same number of poles as that of the armature windings, that is, two poles in this embodiment, which are supplied with the electromotive forces induced in the rotor excitation windings 30 after having been rectified or converted into DC currents. A rectifier 32 for converting the electromotive forces induced in the rotor excitation windings 30 into the DC currents is provided on the rotor iron core 29.

Now, actual operation of the above brushless self-excited synchronous generator is explained hereinafter. Where the rotor is rotated, electromotive forces are induced in the armature windings U, V, W due to the residual magnetism in the rotor iron core 29, so that reactor excitation currents flow in the armature windings and the reactor 28. The fifth-order spatial higher harmonic components of the armature reaction magnetic fields produced by the excitation currents cause the electromotive forces to be induced in the rotor excitation windings 30, and the induced electromotive forces are full-wave rectified by the rectifier 32 connected between the rotor excitation windings 30 and the rotor field windings 31. Consequently, DC currents flow in the rotor field windings 31, whereby the primary magnetic fields increase and the electromotive forces induced in the armature windings increase accordingly. The value of the output voltage is self-established based on the repetition of the above operations. If a variable type reactor is adopted as the reactor 28, the output voltage at the non-loaded state can be freely controlled by the controlling of the reactor excitation currents.

In the case where three-phase loads are loaded to the generator, vector sum currents of the load currents and reactor excitation currents flow in the armature windings U, V, W. Therefore, due to the effects of the reactor, even if the load currents are constant, the amount of currents (armature currents) to flow in the armature windings increases as the lagging degree of the power factor of the loads increases, and the same decreases as the leading degree of the power factor of the loads decreases. As a result, in this generator, in accordance with the advancement of the lagging degree of the load power factor, the series excitation effects of the field system increase whereby the lowering of the output voltage is prevented. On the other hand, in accordance with the advancement of the leading degree of the load power factor, the series excitation effects of the field system decrease whereby the rising of the output voltage based on the self-excitation phenomena by the phase-advancing currents is prevented. That is to say, the above generator internally possesses an automatic voltage control function capable of appropriately responding to the variations in the power factor of the loads. Further, in the case where three-phase unbalanced loads or single-phase loads are loaded to the generator, the generator operates in the same way as in the case of the three-phase balanced loads except that the spatial fundamental component of an opposite phase of the armature reaction magnetic fields add to the series excitation effects of the field system.

However, the brushless self-excited synchronous generators disclosed in Japanese Patent Application Kokai Publication Nos. Hei 3-245755 and Hei 4-285454, respectively, have the following problems.

There has been a common problem in both the generators disclosed in the above publications that two kinds of windings, that is, rotor field windings and rotor excitation windings need be wound on a rotor iron core. The need for a plurality of kinds of windings to be wound on the rotor iron core inevitably makes the rotor structure complex. Further, the mechanical strength of the rotor is lowered. Moreover, the possibility that such accident as short-circuiting or burning caused by the deterioration of insulation becomes high. Therefore, it is desirable that windings of a single kind be wound on the rotor iron core for the purpose of enhancing rigidity and reliability of the generator.

Further, since the brushless self-excited synchronous generator disclosed in the above Japanese Publication No. Hei 3-245755 adopts a method wherein the series excitation effects are obtained by using a specific order harmonic component among the spatial higher harmonic components of the armature reaction magnetic fields produced by the primary generating windings, the number of poles of the rotor excitation windings which are magnetically coupled with the spatial higher harmonic component of the specific order and that of the stator field windings which are magnetically coupled with the rotor excitation windings must be the same number as the number of poles of the specific order harmonic component. For example, in the three-phase two-pole generator, where the fifth-order spatial higher harmonic component of the armature reaction magnetic fields is used as the series excitation effects, the number of poles of both the stator field windings and the rotor excitation windings is required to be ten (10) poles, while in the three-phase four-pole generator, it is required to be twenty (20) poles. For this reason, the number of slots of the stator core and the rotor core on which the above windings are wound is limited to a certain specific number according to the specific order of the spatial higher harmonic components used for the series excitation effects of the field system.

Specifically, in the above three-phase two-pole generator, the number of slots in the stator iron core is specified to 30 n (n being a positive integer) with winding of the primary generating windings on the stator core being taken into consideration, and the number of slots in the rotor iron core is specified to 10 m (m being a positive integer) with winding of the field windings on the rotor core being taken into consideration. In the three-phase four-pole generator, the number of slots in the stator core is specified to 60 n (n being a positive integer) and the number of slots in the rotor core is specified to 20 m (m being a positive integer). The number of slots in both the cores are assumed that slots are provided with regular intervals on the peripheries of the respective cores.

In the case where the number of slots in each of the stator and rotor cores must be limited to a specific number as above, there arises the following problem. In a rotary machine, there is a possibility that a large amount of magnetic vibrations or noise occur depending on some combinations of the number of slots in the stator core and the number of slots in the rotor core. Therefore, in the rotary machines, generally, the combination of the number of slots in each of the stator and rotor cores is so selected that the magnetic vibrations and noise become small. However, in the above explained brushless self-excited synchronous generator, since the number of slots in each of the stator and rotor cores is limited to a certain specific number which is determined by the selected order of the harmonic components, it is not possible to freely select the combination of the numbers of slots for the purpose of reducing the magnetic vibrations and noise. As a result, there has been a possibility that a great amount of magnetic vibrations and noise occur depending on the combination of the slot numbers which are determined by the specific order used of the spatial higher harmonic components.

Further, since the brushless self-excited synchronous generator also adopts a method wherein the series excitation effects are obtained by using the harmonic component of a specific order among the spatial higher harmonic components of the armature reaction magnetic fields produced by the primary generating windings, the rotor excitation windings magnetically coupled with the specific order spatial higher harmonic component are mounted on the rotor, thereby specifying the number of slots in the rotor iron core. Therefore, the selection range in the combinations of the numbers of slots in each of the stator and rotor cores is small. The generator has the same problem that the magnetic vibrations and noise occur as in the generator disclosed in Japanese Patent Application Kokai Publication No. Hei 3-245755.

SUMMARY OF THE INVENTION

It is, therefore, an object of the present invention to provide an improved three-phase brushless self-excited synchronous generator which needs no rotor excitation windings on the rotor.

It is another object of the invention to provide a three-phase brushless self-excited synchronous generator in which the number of slots can be determined irrespective of the order number of the spatial higher harmonic components of the armature reaction magnetic fields, and in which the primary generating windings are not required to have such a winding structure wherein they produce a specific order spatial higher harmonic component.

According to one aspect of the invention, there is provided a three-phase brushless self-excited synchronous generator comprising:

a stator having a stator core, primary generating windings and excitation windings having the number of poles odd-number times the number of poles of the primary generating windings, the primary generating windings and the excitation windings being wound on the stator core;

a rotor having a rotor core and a plurality of field windings wound on the rotor core, having same number of poles as that of the primary generating windings, the plurality of field windings being arranged at positions where they are magnetically coupled with both static magnetic fields produced by the excitation windings and odd-order spatial higher harmonic components of armature reaction magnetic fields produced by the primary generating windings;

a control rectifier means connected between the primary generating windings and the excitation windings, for full-wave rectifying electromotive forces induced in the primary generating windings so that direct currents flow in the excitation windings; and a plurality of semiconductor rectifier elements respectively connected in series in the plurality of field windings, for half-wave rectifying electromotive forces respectively induced in the plurality of field windings so that DC currents flow in the plurality of field windings.

In the generator having the above construction, when the rotor is rotated, a slight electromotive force is induced in the primary generating windings due to the residual magnetism in the rotor core. The above electromotive force induced is rectified by the control rectifier means which is formed the three-phase full-wave rectifier and the variable resistor and which is connected between the primary generating windings and the stator excitation windings, and DC currents flow in the stator excitation windings, thereby forming a static magnetic filed (this static magnetic field resulting in an shunt excitation effect). Also, since three-phase alternating currents flow in the primary generating windings due to the above induced electromotive force, there are produced armature reaction magnetic fields in the primary generating windings (the armature reaction magnetic fields resulting in the series excitation effects). The overlapped magnetic fields of the above static magnetic fields and armature reaction magnetic fields cause the electromotive forces to be induced in each of the plurality of field windings of the rotor, which are magnetically couple with the above static magnetic fields and all the odd-order harmonic components of the armature reaction magnetic fields. The respective electromotive forces induced in the plurality of field windings are respectively half-wave rectified by the semiconductor rectifier elements which are respectively connected to the field windings, and increase the primary magnetic flux in the rotor core accordingly. Further, the increase in the primary magnetic flux increases the above electromotive forces induced in the primary generating windings, whereby the voltage produced in the primary windings at the non-loaded state is self-established through the repetition of the above operations. Here, since the DC currents to flow in the stator excitation windings can be controlled by the controlling of the above control rectifier means, the voltage at the non-loaded state can be controlled to any given value. In the case where no residual magnetism exists in the rotor core, an initial excitation may be made by the temporary connection of the battery to the stator excitation windings.

When the three-phase resistor or inductive loads are connected to the generator explained above, the output voltages are compensated as the three-phase loads increase as follows. Specifically, since the load currents flow to the three-phase loads from the primary generating windings, the armature reaction magnetic fields produced by the primary generating windings due to the load currents increase. Therefore, the odd-order spatial higher harmonic components of the armature reaction magnetic fields increase in proportion to the increase in the load currents and, thus, the increase in the odd-order harmonic components results in the increases in the respective electromotive forces in the plurality of field windings, that is, the increases in the half-wave rectified currents therein. The primary magnetic flux in the rotor core increases and the induced electromotive forces in the primary generating windings increase accordingly. As a result, the impedance voltage drop in the primary generating windings caused by the load currents is compensated by the increase in the induced electromotive forces and, thus, the output voltage of the generator is kept constant with respect to the increase in the three-phase loads.

Since the above three-phase brushless self-excited synchronous generator adopts a theory wherein the primary flux of the field system increases in proportion to the spatial higher harmonic components of the armature reaction magnetic fields produced by the currents of the primary generating windings, the self-establishment of the output voltage in the case where the loads are connected to the primary generating windings and the load currents are flowing therein. Further, in this generator, even in the case where the loads are three-phase unbalanced loads or single-phase loads, since the spatial fundamental component of the opposite phase of the armature reaction magnetic fields newly produced by the three-phase unbalanced currents in the primary generating windings causes electromotive forces to be induced in the plurality of field windings and results in the series excitation effects of the field systems, the decrease in the series excitation effects of the field systems caused by the decrease in the spatial higher harmonic components of the armature reaction field systems which are caused by the three-phase unbalanced currents is compensated. Therefore, the output voltage of the generator is kept substantially constant irrespective of the variations in the loads.

According to another aspect of the invention, there is provided a three-phase brushless self-excited synchronous generator comprising:

a stator having a stator core and primary generating windings wound on the stator core;

a reactor connected in parallel together with loads to output terminals of the primary generating windings;

a rotor having a rotor core and a plurality of field windings wound on the rotor core, having the same number of poles as that of the primary generating windings, the plurality of field windings being arranged at positions where they are magnetically coupled with both static magnetic fields produced by the excitation windings and odd-order spatial higher harmonic components of armature reaction magnetic fields produced by the primary generating windings; and a plurality of semiconductor rectifier elements respectively connected in series in the plurality of field windings, for half-wave rectifying electromotive forces respectively induced in the plurality of field windings so that DC currents flow in the plurality of field windings.

In the generator constructed as above, when the rotor is rotated, a slight electromotive force is induced in the primary generating windings due to the residual magnetism in the rotor core. The above electromotive force causes reactor excitation currents to flow in the primary generating windings and the reactor which together with the loads is connected in parallel to the output terminals of the primary generating windings. Armature reaction magnetic fields are produced by the reactor excitation currents, and the electromotive force is induced in each of the plurality of field windings of the rotor, which are magnetically coupled with all the odd-order spatial harmonics of the armature reaction magnetic fields. The respective electromotive forces in the plurality of the field windings are half-wave rectified by the semiconductor rectifier elements which are respectively connected in series to the field windings, and increase the primary magnetic flux in the rotor core. Further, this increase in the primary flux leads to the increases in the above electromotive forces in the primary generating windings, and through the repetitions of this operation, the output voltage at the non-loaded state is established. Here, in the case where a variable reactor is adopted as the reactor, the output voltage at the non-loaded state can be freely set by the controlling of the reactor excitation currents.

When three-phase resistor loads, inductive loads or capacitive loads are connected to the above generator, the output voltages of the generator against the variations in power factors of the three-phase loads are compensated as follows.

Specifically, since the load currents flow in the primary generating windings due to the connection of the three-phase loads, there flow, in the primary generating windings, vector sum currents of the load currents and the reactor excitation currents. Therefore, due to the effects of the reactor, the currents to flow in the primary generating windings, even if the load currents are constant, increase as the lagging degree of the power factor of the loads increases, while the same currents decrease as the leading degree of the power factor of the loads increases. That is, in this generator, with the advancement of the lagging degree of the power factor of the loads, the currents in the primary generating windings increase and the spatial higher harmonic components of the armature reaction magnetic fields increase, so that the series excitation effects of the field systems increase and the lowering of output voltage is prevented. On the other hand, with the advancement of the leading degree of the power factor of the loads, the currents in the primary generating windings decrease and the spatial higher harmonic components of the armature reaction magnetic fields decrease, so that the series excitation effects of the field systems decrease and the rising of the output voltage caused by the self-excitation phenomena by the phase-advancing currents is prevented. In this way, the generator with loads and the reactor being connected in parallel to the output terminals of the primary generating windings thereof has in itself an automatic voltage control function which is capable of appropriately responding to the variations in the power factor of the loads. Further, in the case where the three-phase unbalanced loads or single-phase loads are connected to the generator, the generator operates in the same way as in the case where the three-phase balanced loads are connected except that the spatial fundamental component of the opposite phase of the armature reaction magnetic fields adds to the series excitation effects of the field systems.

As explained hereinabove, the three-phase brushless self-excited generator according to the present invention does not require rotor excitation windings which are otherwise required as in the prior art and has a simply structured rotor formed by field windings and semiconductor rectifier elements. Further, according to the present invention, the magnetic vibrations and noise, which are caused by the combinations of the number of slots in the stator core and that in the rotor core and which have been the problems in the prior art, are effectively prevented from occurring. Furthermore, because of the non-requirement of the rotor excitation windings on the rotor, the time-constant defined by a resistor component R and an inductive component L becomes small, so that the response speed in the control of the output voltage is fast.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention will be explained with reference to the accompanying drawings.

Figure 3:
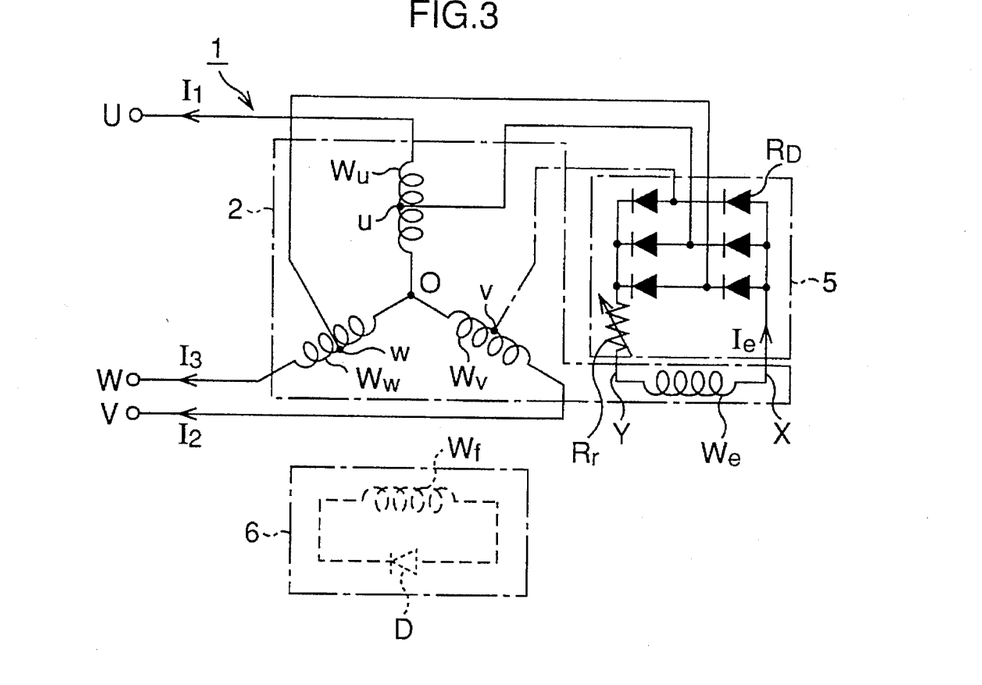
FIG. 3 is a circuit diagram showing a three-phase brushless self-excited synchronous generator of a first embodiment according to the invention.
Figure 4:
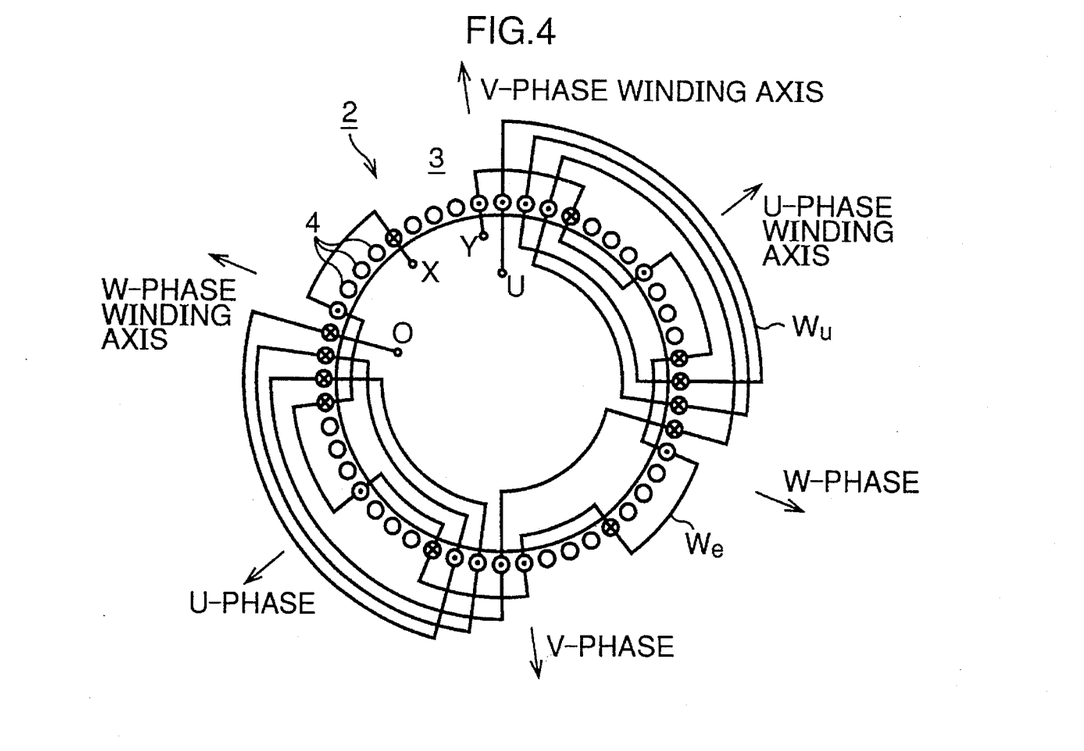
FIG. 4 is a diagram showing slots in the stator of the generator shown in FIG. 3.
Figure 5:
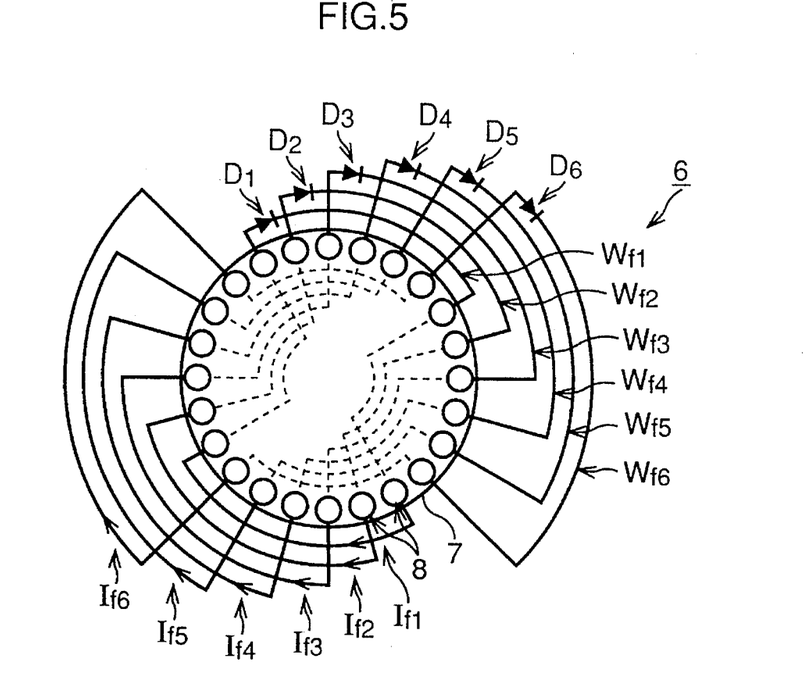
FIG. 5 is a diagram showing slots in the rotor of the generator shown in FIG. 3.

First, a three-phase brushless self-excited synchronous generator according to the invention will be explained hereunder with reference to FIGS. 3–5. FIG. 3 shows a circuit diagram of the generator of the invention, FIG. 4 shows slots in the stator of the generator, and FIG. 5 shows slots in the rotor of the generator. A circuit structure of the stator 2 is first explained. Three-phase primary generating windings $W_U$, $W_V$, $W_W$ of four (4) poles are wound, with phase differences of 120° in the electric angle being provided, on forty eight (48) slots 4 provided in the stator core 3 with regular intervals in such a way that each of the three-phase primary generating windings is wound with a distributed full-pitch winding structure on three slots (in each pole each phase) so that the spatial higher harmonic components of the armature reaction magnetic fields by the three-phase primary generating windings are produced appropriately, and the stator excitation windings $W_e$ of twelve (12) poles which are three (odd number) times the number of poles of the primary generating windings are wound on the slots 4 with a concentrated full-pitch winding structure. In FIG. 4, for the sake of brevity of illustration, the primary generating windings $W_U$ of the U-phase among the three-phase primary generating windings $W_U$, $W_V$, $W_W$ and the stator excitation windings $W_e$ are shown with the other remaining windings $W_V$ and $W_W$ being omitted. The stator excitation windings $W_e$ are connected to the center taps u, v, w of the three-phase primary generating windings $W_U$, $W_V$, $W_W$ through the control rectifier means 5. The control rectifier means 5 is formed by three-phase full-wave rectifier diodes $R_D$ and the variable resistor $R_r$. This control rectifier means 5 is arranged outside the generator. The winding structure of the three-phase primary generating windings is not limitative to the distributed full-pitch windings as in this embodiment so long as they can produce appropriate odd-order spatial higher harmonic components of the armature reaction magnetic fields which are usable for the series excitation effects of the field systems. In the case where the three-phase full-wave rectifier means are constituted by controllable semiconductor devices such as thyristors, the variable resistor $R_r$, is not necessary.

Next, the structure of the rotor 6 is explained with reference to FIG. 5. Six field windings $W_{f1}$, $W_{f2}$, $W_{f3}$, $W_{f4}$, $W_{f5}$, $W_{f6}$ of four (4) poles are wound on twenty four (24) slots 8 provided with regular intervals in the rotor core 7. The above six field windings are so arranged on the slots that each of the six field windings is magnetically coupled with both the odd-order spatial higher harmonic components of the armature reaction magnetic fields based on the currents $I_1$, $I_2$, $I_3$ in the three-phase primary generating windings and the spatial fundamental component of the static magnetic field based on the current $I_e$ in the stator excitation windings. The six field windings $W_{f1}$, $W_{f2}$, $W_{f3}$, $W_{f4}$, $W_{f5}$ and $W_{f6}$ are respectively short-circuited by the diodes $D_1$, $D_2$, $D_3$, $D_4$, $D_5$ and $D_6$.

In the generator having the above structure, when the rotor 6 on which the field windings $W_{f1}$, $W_{f2}$, $W_{f3}$, $W_{f4}$, $W_{f5}$, $W_{f6}$ are wound is rotated, the electromotive forces are slightly induced in the primary generating windings $W_U$, $W_V$, $W_W$, and alternating currents flow in the primary generating windings $W_U$, $W_V$, $W_W$ accordingly, whereby the armature reaction magnetic fields are produced. At the same time, in the stator excitation windings $W_e$, there flow DC currents $I_e$ which are obtained by full-wave rectifying the induced electromotive forces in the primary generating windings $W_U$, $W_V$, $W_W$ by the three-phase full-wave rectifier $R_D$ of the control rectifier means 5 connected between the center taps of the primary generating windings $W_U$, $W_V$, $W_W$ and the stator excitation windings $W_e$, whereby the static magnetic fields are produced by the stator excitation windings $W_e$. These magnetic fields cause the overlapped electromotive forces to be induced in each of the six field windings $W_{f1}$, $W_{f2}$, $W_{f3}$, $W_{f4}$, $W_{f5}$, $W_{f6}$. The electromotive forces thus induced are respectively half-wave rectified by the series diodes $D_1$, $D_2$, $D_3$, $D_4$, $D_5$ and $D_6$, so that the primary magnetic flux of the rotor 6 is increased and the electromotive forces induced in the primary generating windings $W_U$, $W_V$, $W_W$ are increased accordingly. By the repetition of the above operations, the generating voltage by the primary generating windings $W_U$, $W_V$, $W_W$ is established. Here, the currents $I_e$ flowing in the stator excitation windings are controlled by the adjustment of the variable resistor $R_r$, so that the voltage of the generator 1 at the non-loaded state can be freely controlled.

In the case where there exists no residual magnetism in the rotor 6, the battery (not shown) may be temporarily connected to the stator excitation windings of the rotor 6 in the same manner as in the first embodiment, so that an electromotive force is induced in the field windings of the rotor. A half-wave rectified current based on this electromotive force causes the primary magnetic flux to be induced in the rotor.

Next, when the three-phase resistor or inductive loads are applied to this generator 1, the operation thereof is as follows. When the three-phase resistor or inductive loads are connected to the generator 1, the loads current $I_{x1}$, $I_{x2}$, $I_{x3}$ flow out from the primary generating windings $W_U$, $W_V$, $W_W$, and due to these load currents $I_{x1}$, $I_{x2}$, $I_{x3}$ the armature reaction magnetic fields produced by the primary generating windings $W_U$, $W_V$, $W_W$ increase. Therefore, the spatial higher harmonic components of the armature reaction magnetic fields increase, the respective electromotive forces induced in the field windings $W_{f1}$, $W_{f2}$, $W_{f3}$, $W_{f4}$, $W_{f5}$, $W_{f6}$ individually wound at the positions where they are magnetically coupled with the above spatial higher harmonic components increase, and thus the field currents $I_{f1}$, $I_{f2}$, $I_{f3}$, $I_{f4}$, $I_{f5}$, $I_{f6}$ flowing in the field windings increase. As a result, the electromotive forces induced in the primary generating windings increase, so that the variations in the output voltages against the increase in the impedance voltage drop are compensated. Namely, in the generator according to the invention, the increase and decrease in the loads currents $I_{x1}$, $I_{x2}$, $I_{x3}$ in accordance with the increase and decrease in the loads results in the increase and decrease in the field current $I_{f1}$, $I_{f2}$, $I_{f3}$, $I_{f4}$, $I_{f5}$, $I_{f6}$ of the rotor and, as a result, the electromotive forces induced in the primary generating windings $W_U$, $W_V$, $W_W$ increase or decrease, whereby the increase or decrease in the impedance voltage drop in the primary generating windings is compensated. Consequently, the generator 1 generates substantially constant output voltage (flat-compound characteristics) irrespective of the increase or decrease in the loads.

Further, in the generator according to the invention, even if the loads of the three-phase unbalanced or single-phase are applied thereto, the spatial fundamental component of the opposite phase of the armature reaction magnetic fields newly produced by the three-phase unbalanced currents in the primary generating windings causes an electromotive force to be induced in each of the plurality of the field windings so that the series excitation effects of the field systems are achieved. Consequently, the decrease in the series excitation effects of the field systems based on the decrease in the spatial higher harmonic components of the armature reaction magnetic fields caused by the three-phase unbalanced currents is compensated, whereby the output voltage of the generator is compensated against the variations in the loads.

Figure 6:
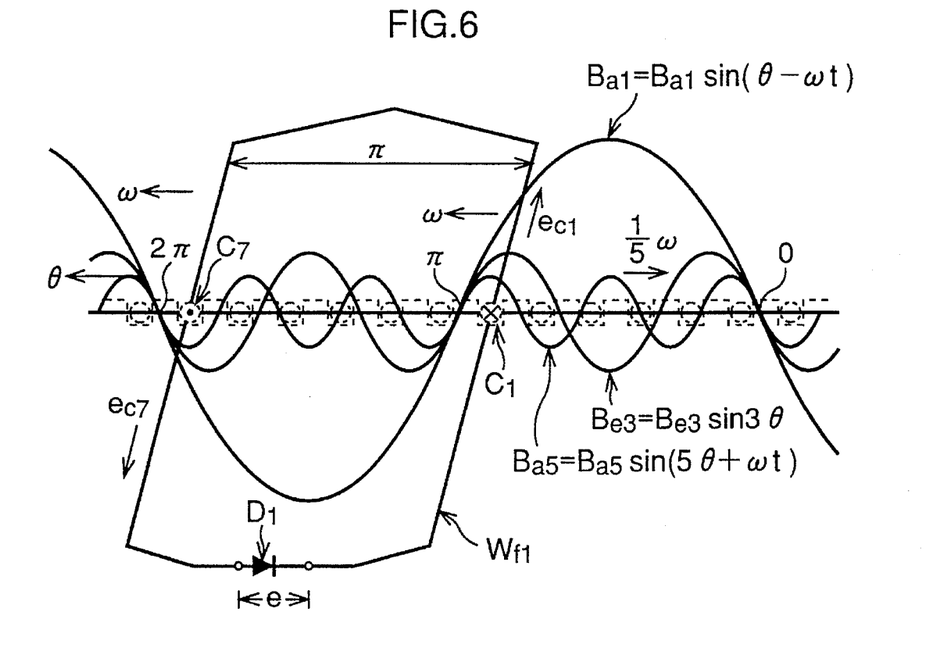
FIG. 6 is a graph showing the fundamental component and odd-order harmonics of the spatial higher harmonic components in the generator shown in FIG. 3.

Now, the function of the field windings wound on the rotor of the generator according to the invention is explained hereunder. A plurality of field windings $W_{f1}$, $W_{f2}$, $W_{f3}$, $W_{f4}$, $W_{f5}$, $W_{f6}$ are wound on the rotor, that is, wound sequentially in a given number of slots 4 provided with regular intervals in the rotor core 3, in such a manner that the individual field windings have the same pole pitch, that is, 180° in the electric angle as that of the primary generating windings $W_U$, $W_V$, $W_W$ so as to be magnetically coupled with the spatial fundamental component of the static magnetic fields produced by the stator excitation windings $W_e$ (twelve (12) poles in this embodiment). Here, the distributions of the fundamental and fifth-order harmonic components (lower-order harmonics) among the harmonic components of the armature reaction magnetic fields produced by the primary generating windings, the distributions of the spatial fundamental component of the static magnetic fields produced by the stator excitation windings, and also the arrangement of one field windings among the plurality of the field windings are shown in FIG. 6. Here, the function of the rotor, specifically of the field windings wound thereon is explained by showing the electromotive force induced in the field windings of the rotor which is based on the fifth-order spatial higher harmonic components of the armature reaction magnetic fields and also the spatial fundamental component of the static magnetic fields.

Since the three-phase primary generating windings have such a winding structure that it can produce the spatial higher harmonic components including the odd-order harmonics, the spatial distribution $B_a$ of the armature reaction magnetic fields by the three-phase balanced currents in the three-phase primary generating windings is given by the following Formula (1):

$$B_a = B_{a1}\sin(\theta-\omega t) + B_{a5}\sin(5\theta+\omega t) + B_{a7}\sin(7\theta-\omega t) + \quad (1)$$

in which $B_{a1}$ represents the spatial fundamental component of the armature reaction magnetic fields based on the currents in the primary generating windings; $B_{a5}$ represents the fifth-order spatial higher harmonic component of the armature reaction magnetic fields based on the currents in the primary generating windings; Ba7 represents the seventh-order spatial higher harmonic component of the armature reaction magnetic fields based on the currents in the primary generating windings.

On the other hand, the spatial distribution $B_e$ of the static magnetic fields based on the DC currents in the stator excitation windings $W_e$ (twelve (12) poles in this embodiment) is given by the following Formula (2):

$$B_e = B_{e3}\sin 3\theta + B_{e9}\sin 9\theta + B_{e15}\sin 15\theta + \quad (2)$$

in which $B_{e3}$ represents the spatial fundamental component of the static magnetic fields based on the currents in the stator excitation windings.

The electromotive force induced in the field windings $W_e$ ($C_1$, $C_7$) based on the fifth-order spatial higher harmonic components given in the Formula (1) and the spatial fundamental component given in the Formula (2) is given by the following Formula (3):

$$e = 2E_{a5}\sin(6\omega t + \alpha) + 2E_{e3}\sin(3\omega t + \beta) \quad (3)$$

in which e represents an electromotive force at one field winding, ω represents an angular velocity, and α, β represent a phase difference.

Thus, an electromotive force expressed by the above Formula (3) is induced in the field windings $W_e(C_1, C_7)$ and half-wave rectified by the diode $D_1$ (semiconductor rectifier element) connected in series to the field windings $W_e$. The rectified DC currents flow in the field windings so that the primary magnetic poles are produced in the rotor. More specifically, all the other odd-order spatial higher harmonic components included respectively in the above Formulas (1) and (2) also cause the electromotive forces to be induced in the field windings which are arranged with 180° pitch in the electric angle, thereby contributing to the formation of the field magnetic poles. In the case where three-phase unbalanced currents flow in the three-phase primary generating windings, an electromotive force due to the spatial fundamental component of the opposite phase of the armature reaction magnetic fields is newly added to the field windings.

An automatic voltage regulator (AVR) may be connected to the stator excitation windings $W_e$. Further, prior art techniques for DC excitation of the stator can be applied to the generator of the present invention.

Figure 7:
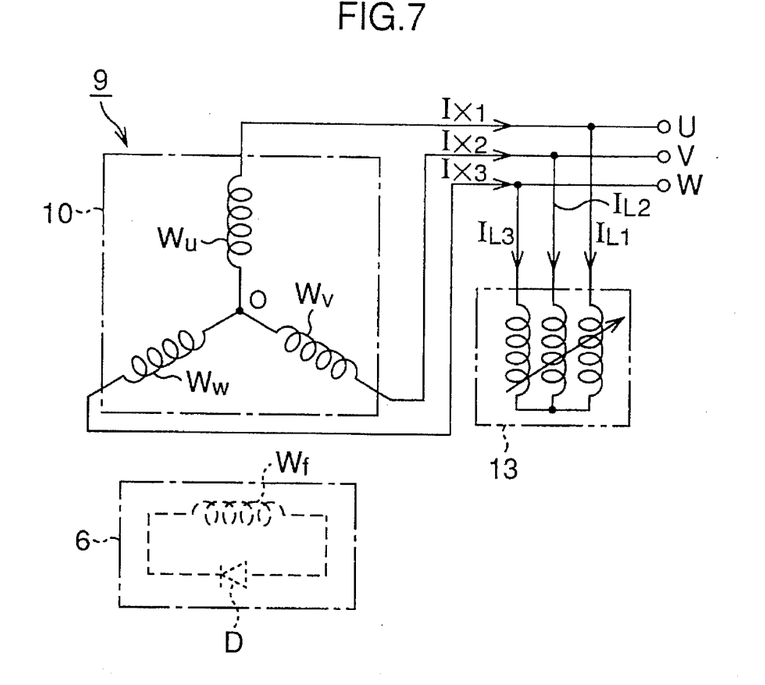
FIG. 7 is a circuit diagram showing a three-phase brushless self-excited synchronous generator of a second embodiment according to the invention.
Figure 8:
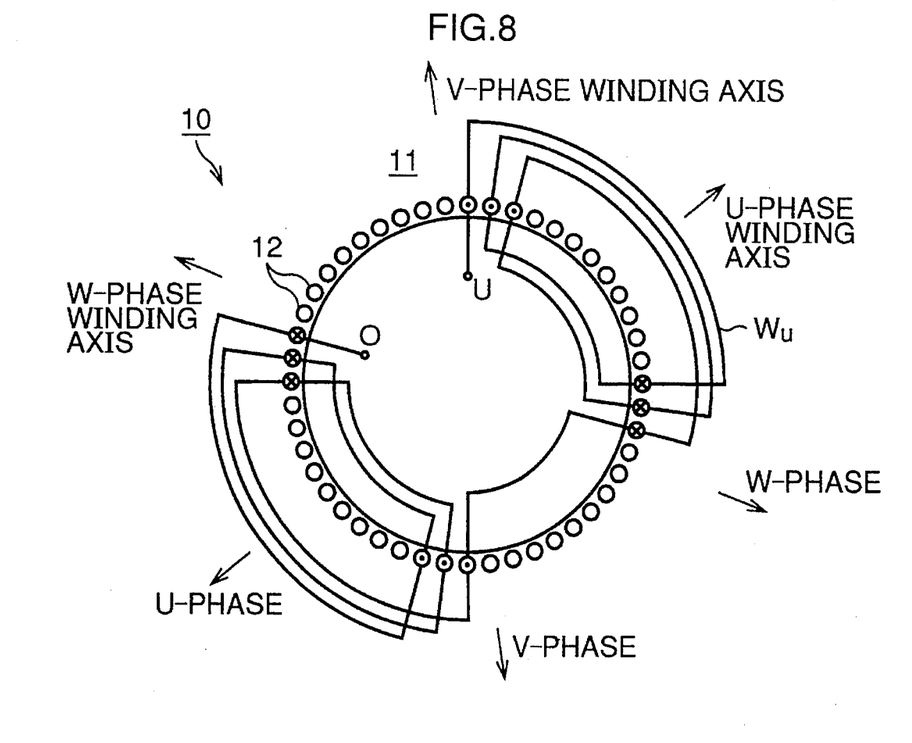
FIG. 8 is a diagram showing slots in the stator of the generator shown in FIG. 7.

Now, a generator of a second embodiment according to the invention is explained with reference to FIGS. 7 and 8. FIG. 7 shows a diagram of the three-phase brushless self-excited synchronous generator of the second embodiment and FIG. 8 shows a structure of slots 12 of a stator 10 of the generator of the second embodiment. Because the rotor in the second embodiment is the same as that shown in FIG. 3 in the above explained first embodiment, both the explanation and illustration thereof are omitted here. First, the structure of the stator 10 is explained. Three-phase primary generating windings $W_U$, $W_V$, $W_W$ of four (4) poles are wound on forty eight (48) slots provided with regular intervals in a stator core 11 with a phase difference of 120° being provided. Each of the three-phase primary windings is wound with three (3) slots (each pole and each phase) with the distributed full-pitch windings so as to appropriately produce the spatial higher harmonic components of the armature reaction magnetic fields. In FIG. 6, only U-phase primary generating winding $W_U$ among the primary generating windings $W_U$, $W_V$, $W_W$ is shown. Further, a variable reactor 13 is connected to the output terminals U, V, W of the primary generating windings in parallel together with the loads. The structure of the three-phase excitation windings is not limitative to the distributed full-pitch windings as in this embodiment so long as they can produce odd-order spatial higher harmonic components of the armature reaction magnetic fields which can be used for attaining the series excitation effects of the field system. As the circuit structure of the rotor in this embodiment is the same as that of the rotor 6 in the above first embodiment, the detailed explanation of the rotor is omitted here.

In the generator having the above structure, when the rotor 6 on which the field windings $W_{f1}$, $W_{f2}$, $W_{f3}$, $W_{f4}$, $W_{f5}$, $W_{f6}$ are wound is rotated, a small amount of electromotive force is induced in the primary generating windings $W_U$, $W_V$, $W_W$ due to the residual magnetism in the rotor core 7 and, therefore, reactor excitation currents $I_{L1}$, $I_{L2}$, $I_{L3}$ flow in the primary generating windings and the variable reactor 13. The currents flowing in the primary generating windings $W_U$, $W_V$, $W_W$ produce the armature reaction magnetic fields. There is induced an electromotive force in each of the six field windings $W_{f1}$, $W_{f2}$, $W_{f3}$, $W_{f4}$, $W_{f5}$, $W_{f6}$ of the rotor which are magnetically coupled with odd-order spatial higher harmonic components of the armature reaction magnetic fields. The electromotive forces thus induced in the field windings are respectively half-wave rectified by the diodes $D_1$, $D_2$, $D_3$, $D_4$, $D_5$, $D_6$ respectively connected in series with the six field windings, so as to increase the primary magnetic fields of the rotor 6, thereby increasing the electromotive forces induced in the primary generating windings $W_U$, $W_V$, $W_W$. By the repetition of the above operations, the generated output voltage of the primary generating windings $W_U$, $W_V$, $W_W$ is established. Here, by adjusting the variable reactor 13 so as to control the reactor currents $I_{L1}$, $I_{L2}$, $I_{L3}$, the output voltage of the generator 9 at the non-loaded state can be freely controlled.

In the case where there exists no residual magnetism in the rotor 6, the battery B may be temporarily connected to the primary generating windings so that an electromotive force is induced in the field windings of the rotor. A half-wave rectified current based on this electromotive force causes the primary magnetic field to be induced in the rotor.

Next, when the three-phase inductive or capacitive loads are applied to this generator 9, the operation thereof is as follows. When the three-phase loads are connected to the generator 9, there flow vector sum currents of the load currents $I_{x1}$, $I_{x2}$, $I_{x3}$ and the reactor currents $I_{L1}$, $I_{L2}$, $I_{L3}$ in the primary generating windings $W_U$, $W_V$, $W_W$. Therefore, due to the effects of the reactor 13, even if the magnitudes of the load currents $I_{x1}$, $I_{x2}$, $I_{x3}$ are constant, the magnitudes of the currents to flow in the primary generating windings $W_U$, $W_V$, $W_W$ increase as the lagging degree of power factor of the loads increases, while the magnitudes of the same decrease as the leading degree of the power factor of the loads increases. The increase and decrease of the vector sum currents result in the increase and decrease of the armature reactor magnetic fields produced by the primary generating windings $W_U$, $W_V$, $W_W$. Therefore, the spatial higher harmonic components of the armature reaction magnetic fields increase or decrease, the electromotive forces respectively induced in the field windings $W_{f1}$, $W_{f2}$, $W_{f3}$, $W_{f4}$, $W_{f5}$, $W_{f6}$ which are individually wound at the positions where they are magnetically coupled with the spatial higher harmonic components increase or decrease and, thus, the half-wave rectified currents $I_{f1}$, $I_{f2}$, $I_{f3}$, $I_{f4}$, $I_{f5}$, $I_{f6}$ in the field windings increase or decrease. As a result, the induced electromotive forces in the primary generating windings increase or decrease. In this way, in the generator 9 of the second embodiment according to the invention, as the lagging degree of the power factor of the loads increases, the series excitation effects of the field windings increase so that the output voltage is prevented from lowering. On the other hand, as the leading degree of the power factor of the load increases, the series excitation effects of the field windings decrease so that rising of the output voltage based on the self-excitation phenomena by the phase-advancing currents is prevented from occurring. Namely, this generator 9 has an automatic voltage regulating (AVR) function in itself which is capable of appropriately responding to the variations in the load power factors.

Though the number of slots in the rotor in the first and second embodiments explained above is twenty four (24), the number of slots may be twenty (20) so that the plurality of rotor field windings are arranged in the slots in such a way that they are magnetically coupled at the maximum with the fifth-order harmonic component among the odd-order spatial higher harmonic components. In this case, the field windings are coupled with other odd-order harmonic components than the fifth-order harmonic component, though such coupling is weak. The advantages of the present invention are not lost even if the arrangement is such that the field windings are to be magnetically coupled with the spatial higher harmonic component of the specific order. Namely, when a plurality of field windings having the same number of poles as that of the stator primary windings are to be wound on the rotor core, the plurality of field windings are arranged on the rotor core so as to be magnetically coupled with the odd-order spatial higher harmonic components.

Further, in the generator according to this embodiment, even when three-phase unbalanced or single-phase loads are applied thereto, since the spatial fundamental component of an opposite phase of the armature reaction magnetic fields newly produced by the three-phase unbalanced currents flowing in the primary generating windings causes an electromotive force to be induced in each of the plurality of the field windings and results in the series excitation effects of the field system, the decrease in the series excitation effects of the field system caused by the decrease in the spatial higher harmonic components of the armature reaction magnetic fields by the three-phase unbalanced currents is compensated. Consequently, the output voltage of the generator is kept constant against the variations in the loads.

As has been explained hereinabove, in the brushless synchronous generator according to the invention, rotor excitation windings becomes unnecessary which have been indispensable in the prior art generators. As a result, the rotor can be constructed in simple and rigid by the rotor field windings and the semiconductor rectifier means. Next, since there is no limitation in the number of slots in the rotor, the magnetic vibrations and noise caused by the combinations of the number of slots in the stator and rotor cores are effectively suppressed. The time constant of the rotor circuit becomes small due to the elimination of the rotor excitation windings, so that the response speed of the controlling of the output voltage becomes fast.

Further, since the rotor is so constructed that it is magnetically coupled with the odd-order harmonic components of both the armature reaction field magnetic fields and the static magnetic fields, in any case where three-phase balanced loads, three-phase unbalanced loads or single-phase loads are connected to the generator, the series excitation effects can be further enhanced, whereby the output voltage of the generator can be more effectively compensated against the variations in the loads.

As explained hereinabove, according to the present invention, there is provided a three-phase brushless self-excited synchronous generator attaining a great advantageous effects.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A three-phase brushless self-excited synchronous generator comprising:

a stator having a stator core, primary generating windings and excitation windings having the number of poles odd-number times the number of poles of said primary generating windings, said primary generating windings and said excitation windings being wound on said stator core;

a rotor having a rotor core and a plurality of field windings wound on said rotor core, having the same number of poles as that of said primary generating windings, said plurality of field windings being arranged at positions where they are magnetically coupled with both static magnetic fields produced by said excitation windings and odd-order spatial higher harmonic components of armature reaction magnetic fields produced by said primary generating windings;

a control rectifier means connected between said primary generating winding and said excitation windings, for full-wave rectifying electromotive forces induced in said primary generating windings so that direct currents flow in said excitation windings; and a plurality of semiconductor rectifier elements respectively connected in series in said plurality of field windings, for half-wave rectifying electromotive forces respectively induced in said plurality of field windings so that DC currents flow in said plurality of field windings.

2. A three-phase brushless self-excited synchronous generator according to claim 1, wherein said control rectifier means comprises a three-phase full-wave rectifier and a variable resistor.

3. A three-phase brushless self-excited synchronous generator according to claim 1, wherein said control rectifier means has a three-phase full-wave rectifier formed by a controllable semiconductor rectifier element.

4. A three-phase brushless self-excited synchronous generator according claim 1, wherein each of said plurality of field windings is sequentially provided, with an electric angle of 180° corresponding with a pole pitch of said primary generating windings, on a given number of slots provided in said rotor core with regular intervals.

5. A three-phase brushless self-excited synchronous generator comprising:

a stator having a stator core and primary generating windings wound on said stator core;

a reactor connected in parallel together with loads to output terminals of said primary generating windings;

a rotor having a rotor core and a plurality of field windings wound on said rotor core, having the same number of poles as that of said primary generating windings, said plurality of field windings being arranged at positions where they are magnetically coupled with both static magnetic fields produced by said excitation windings and odd-order spatial higher harmonic components of armature reaction magnetic fields produced by said primary generating windings; and a plurality of semiconductor rectifier elements respectively connected in series in said plurality of field windings, for half-wave rectifying electromotive forces respectively induced in said plurality of field windings so that DC currents flow in said plurality of field windings.

6. A three-phase brushless self-excited synchronous generator according to claim 5, wherein said reactor is a variable reactor in which reactor excitation currents are controllable.

7. A three-phase brushless self-excited synchronous generator according claim 5, wherein each of said plurality of field windings is sequentially provided, with an electric angle of 180° corresponding with a pole pitch of said primary generating windings, on a given number of slots provided in said rotor core with regular intervals.

* * * * *